Nov. 12, 1940.   E. A. JOHNSTON ET AL   2,221,546
TRACTOR
Filed Nov. 25, 1938   4 Sheets-Sheet 1

Inventors
Edward A. Johnston
Alexus C. Lindgren
By
Atty.

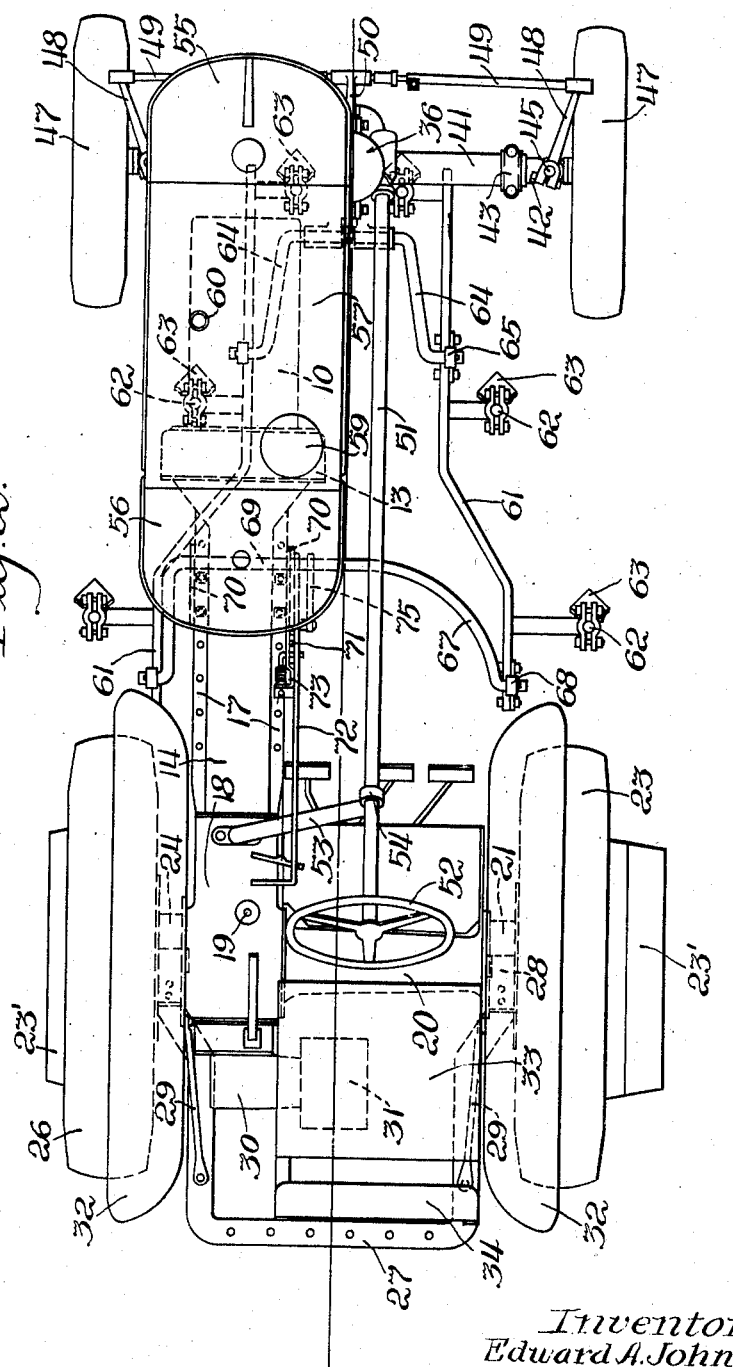

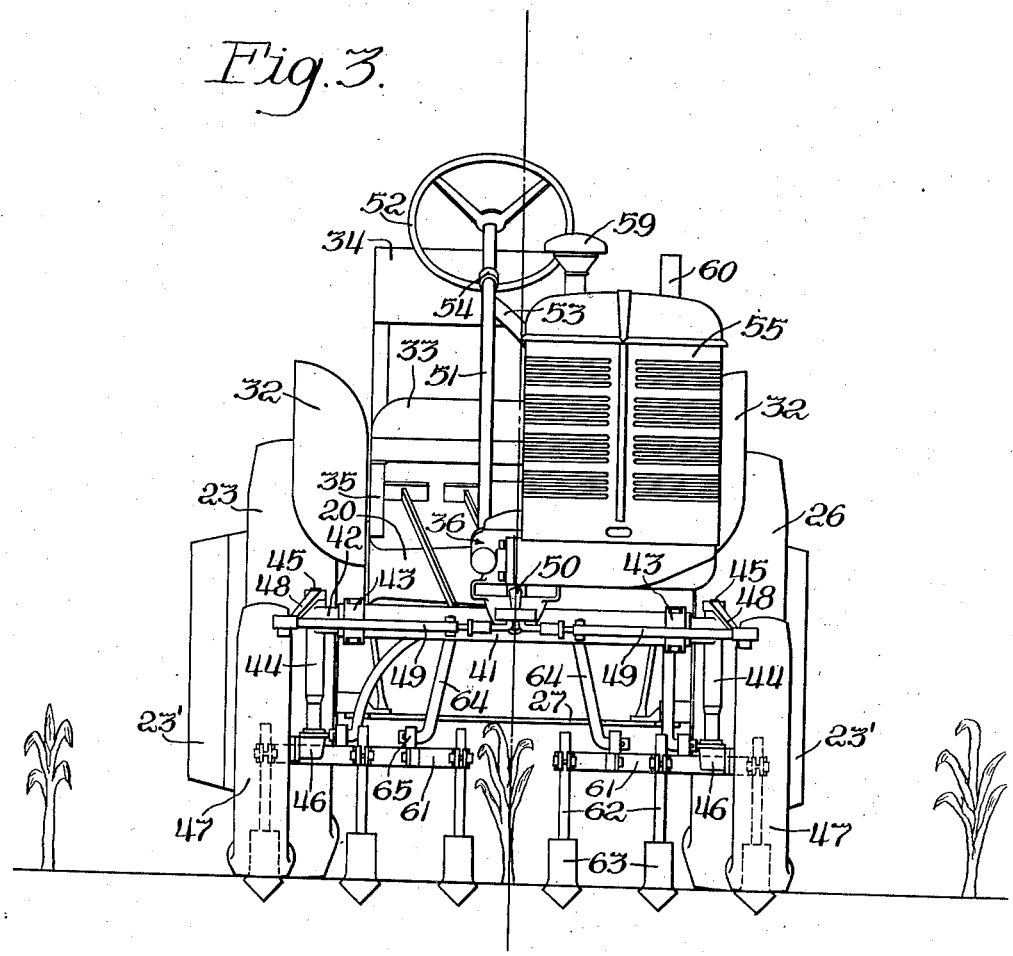

Nov. 12, 1940. E. A. JOHNSTON ET AL 2,221,546
TRACTOR
Filed Nov. 25, 1938 4 Sheets-Sheet 4
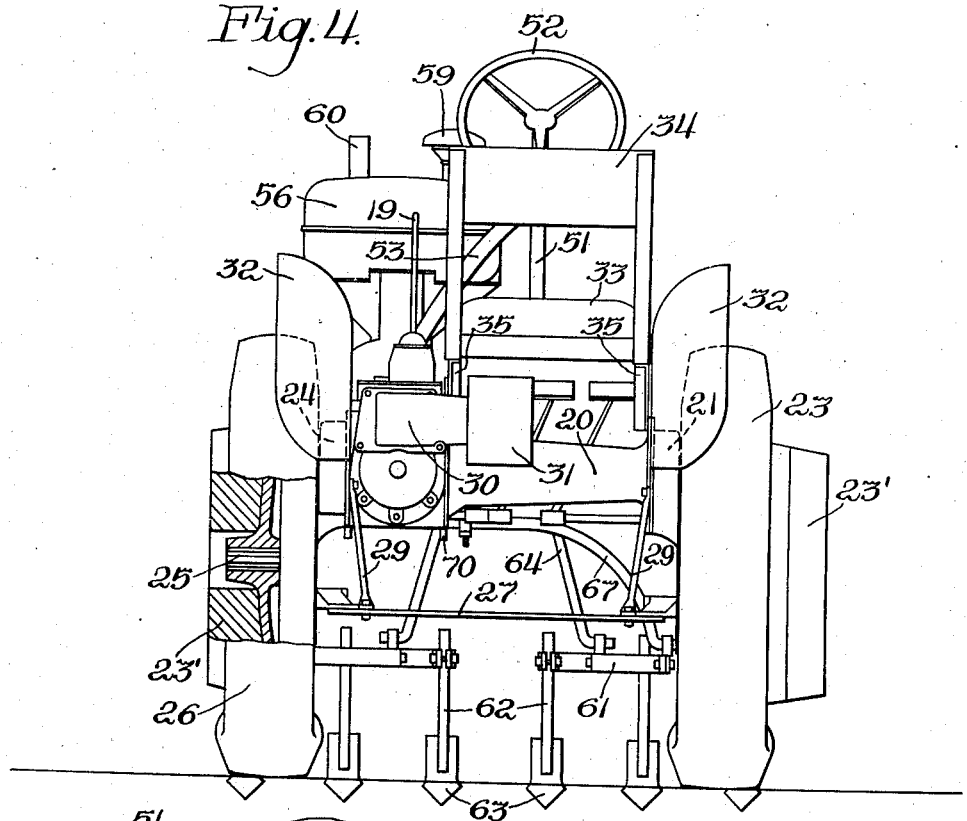
Inventors
Edward A. Johnston
Alexus C. Lindgren
By V. F. Lassagne
Att'y Patented Nov. 12, 1940

2,221,546

UNITED STATES PATENT OFFICE 2,221,546

TRACTOR

Edward A. Johnston and Alexus C. Lindgren, Chicago, Ill., assignors to International Harvester Company, a corporation of New Jersey Application November 25, 1938, Serial No. 242,239

11 Claims. (Cl. 180—1)

This invention relates to a farm tractor. More specifically it relates to a tractor particularly adapted for row-crop work.

In recent years, tractors adapted to carry agricultural implements directly mounted thereon have come into extensive use. Such tractors have been largely of the so-called "tricycle" type in which the front wheel or wheels operate between adjacent rows and the rear wheels straddle the rows. This type of tractor is suited to two-row cultivators and other such attachments for operating simultaneously on two rows. It is also equally satisfactory for operating upon either one of the two rows being straddled. As the power plant and frame structure, which is as narrow as can be satisfactorily constructed, is centrally between the rows, an operator at the rear of the tractor has satisfactory vision of the approaching rows and of the rows passing directly beneath the tractor.

More recently smaller tractors have come into use. Such tractors are built smaller and at as low a cost as possible and usually have power for only one-row operation. This type of tractor must be of the four wheel type and the row being operated upon, therefore, passes centrally beneath the tractor. With tractors of this type, the operator at the rear of the tractor can view the approaching row only with difficulty, and usually the frame structure interferes also to some extent with vision directly downwardly beneath the tractor of the row being operated upon.

It is to a tractor of the single row type that the present invention relates.

The principal object it to construct a tractor which provides adequate vision forwardly of the tractor so that the operator may view the approaching row.

Another object is to construct a tractor having a frame structure which gives unobstructed vision below the tractor of the row being operated upon, particularly at a point substantially in transverse alinement with the front steerable wheels, whereby the rows may be closely followed with the soil-working elements or other plant-engaging elements adjacent the plants.

Another object is to mount an off-set frame structure at a central point on a front axle with a minimum of obstruction to vision.

Another object is to provide an operator's station which is accessible and which provides adequate room for an operator on a small size tractor of the type to which the invention relates.

The above objects and others, which will be apparent from the detailed description to follow, are obtained by a tractor construction in which the frame and the power plant are located substantially laterally to one side of the center line of the tractor, it being understood that the center line of the tractor during operation will lie over the row being operated upon.

The drawings illustrate a preferred embodiment of a tractor designed to attain the objects of the invention.

In the drawings:

Figure 1 is a side elevation of a tractor incorporating the features of the invention;

Figure 2 is a plan view of the tractor shown in Figure 1;

Figure 3 is a front view of the tractor shown in Figure 1;

Figure 4 is a rear view of the tractor shown in Figure 1; and,

Figure 5 is an enlarged detail of the steering gear housing and front end supporting member.

The tractor illustrated is one having a unit body or frame construction; that is, one in which the crank-case of the engine forms a structural unit of the frame. A power plant in the form of an engine 10 is shown in outline, said engine having a crank-case 11 which forms the forward portion of the frame structure. An oil pan 12 is shown located beneath the crank-case 11. A fly-wheel and clutch housing 13 may be formed as a unit with the crank-case 11 or rigidly secured thereto. A narrow rear frame member 14 in the form of a casting, U-shaped in cross-section, is provided with a flared front end portion 15 to provide a flange 16, by means of which the rear frame member is secured to the fly-wheel housing 13. The frame member 14 is provided with apertured lateral flanges 17 to provide for connecting implements at a plurality of longitudinally spaced locations.

At its rear end, the frame member 14 is rigidly secured to a transmission casing 18 which contains a change-speed transmission for delivering the engine power of the tractor to the final drive mechanism. It is to be understood that a propeller shaft extends from the fly-wheel housing 13 rearwardly to the transmission casing 18. A gear shift lever 19 is shown extending upwardly of the transmission 18 within reach of the operator's station. The transmission casing 18 is extended rearwardly to include also the usual differential mechanism for the final drive. At the right side of the casing 18, a rear axle housing structure 20 is rigidly secured, extending a substantial distance outwardly at that side of the tractor. The length of the housing structure 20 is sufficient to bring the center line of the tractor, as will be further described, on the center line indicated in Figure 3. A gear housing 21 rigidly secured to a flange at the outer end of the structure 20 depends downwardly to form an arched rear axle construction. Said housing contains reduction gearing for driving a stub axle 22 which carries a pneumatic tired wheel 23.

Wheel weights 23' shown in Figure 2 increase the traction obtainable with pneumatic tires. At the side of the tractor opposite the frame structure, an additional weight is attached to balance the overhanging weight of the frame structure, thereby preventing any tipping tendency and equalizing wheel traction.

At the left side of the casing 18, a housing 24 substantially the same as the housing 21 extends downwardly and encloses reduction gearing for driving a stub axle 25 which carries a pneumatic tired wheel 26. It will be noted in Figure 4 that the wheel 26 is shown as having an off-set hub. By means of this construction and a similar construction of the other wheel 23, the wheels may be reversed, as is common practice, to vary the rear tread of the tractor. It will be understood that any type of final drive mechanism may be utilized and that the axle structure may be arched, as shown, or of the straight-through type. By using depending housings 21 and 24, as shown, smaller wheels and tires may be utilized and at the same time sufficient clearance may be obtained under the axle housing structure 20 for the passage of plants.

A U-shaped draw-bar 27 is illustrated, said draw-bar being secured at its forward end by attaching members 28 to the depending portions of the housings 21 and 24. Upwardly extending braces 29 are secured to the draw-bar and to the upper portions of the housings 21 and 24 to hold the draw-bar rigidly in position.

A housing 30 is shown connected to the rear of the casing 18 to provide power take-off gearing for operating a pulley 31 located laterally to one side of the casing 18, and, as will be evident from Figures 2 and 4, substantially on the center line of the tractor.

Fenders 32 connected to the rear axle housing structure extend upwardly and outwardly over the rear wheels 23. An operator's seat 33 having a back supporting portion 34 is mounted by suitable means, not shown in detail, including brackets 35 on the rear axle housing structure. Said seat is located somewhat to the rear of the axis of the rear wheel and as far to the right as possible, that is, adjacent the right fender 32. The positioning of the seat is an important feature in connection with the visibility, as will be hereinafter described. It will be noted that the power take-off pulley 31 is under the seat 33 whereby a compact structure is attained.

A steering gear housing and front end supporting member 36 is rigidly secured on a vertical longitudinally faced portion of the crank-case casting by a plurality of cap screws. Said member is provided with longitudinally spaced, downwardly extending portions 38 which are formed with alined openings for a pivot pin 39. Said pin also extends through a bore formed in an axle-connecting member 40 having an extended portion fitted between and abutting the two downwardly extending portions 38. The member 40 is rigidly secured to the center of a tubular front axle 41. Said axle is constructed as a hollow member to slidably receive cylindrical members 42 which form the outer end portions of the front axle. Clamping brackets 43 provide means for securing the members 42 in a plurality of adjusted positions, thereby providing means for adjusting the tread of the front axle.

Vertical tubular members 44 rigidly secured to the outer members 42 provide means for mounting vertical spindles 45 of front steerable axles 46. Pneumatic tired wheels 47 are mounted on said axles. Steering arms 48 connected to the top of the spindles 45 are connected by a pair of adjustable tie rods 49 with a central steering arm 50.

The steering arm 50 extends forwardly from the housing 36. The gearing within the housing has not been illustrated as it may be of any conventional type, which will provide means for oscillating the steering arm 50 through the desired angular range. A steering shaft 51 extending into the housing 36 extends angularly rearwardly and upwardly, being provided with a steering wheel 52 at the rear end. A supporting member 53 rigidly secured to the top of the casing 18 is curved over at its upper end and secured by a bracket 54 to the shaft 51. The steering shaft is thus supported in a position not to interfere with an operator mounted on the seat 33 and does not obstruct the operator getting on or off the seat. The steering shaft is substantially in the line of vision of the operator and does not, therefore, interfere materially with the view of the row being operated upon.

To complete the showing, a radiator grill 55 at the front of the tractor, a gasoline tank 56 at the rear of the engine and a hood 57 connecting the gasoline tank and the grill 55 have been illustrated in a somewhat diagrammatic manner. An air cleaner 58 shown in dotted lines is provided with an air in-take 59 extending above the hood 57. An exhaust pipe 60 is also illustrated.

In the operation of a tractor, as above described, implements may be pulled behind the tractor or directly connected thereto. Due to the off-set construction, there will be substantially more weight on the left hand side of the tractor and on the rear wheel at that side. It has been found in actual practice during plowing operations that more weight is desirable on the land side wheel than on the wheel in the furrow. This is due to the fact that the furrow wheel is following on firm soil and is less liable to slippage than the land wheel, which, under some conditions, is operating on dry pulverized dirt. The side draft encountered in pulling a breaking plow with the tractor operating with the right wheel in the furrow is such that a tractor of this invention is adequately suited for such an operation.

Where the tractor is to be used for purposes in which both wheels operate on soil of the same conditions and in which substantially equal torque is applied to both wheels, the off balance weight of the tractor may be corrected by the addition of wheel weights to the wheel at the right side of the tractor. With the extensive use of pneumatic tires at the present time, wheel weights are almost universally used in order to obtain the desired traction. It is only necessary in a tractor of this type to add additional weight to the right hand wheel where conditions require a uniform weight balance and uniform traction on the two wheels.

To illustrate the use of the off-set tractor of this invention for row-crop work, a cultivating attachment has been shown on the tractor. A pair of longitudinally positioned beams 61 having laterally off-set rear end portions are positioned beneath the frame of the tractor symmetrical with respect to the center line thereof extending forwardly adjacent the front axle of the tractor. A plurality of shanks 62 mounted on the beams 61 carry cultivating shovels 63. It will be noted that the front shovels are closely spaced to operate closely adjacent rows of plants, a plant being diagrammatically illustrated in Figure 3. The front shovels are also substantially under the front axle of the tractor in alinement with the contact points of the front wheels with the ground.

At points spaced rearwardly from the front ends of the beams 61, lifting links 64 are pivotally connected to brackets 65, the links 64 extending forwardly and upwardly at substantially a 45° angle when the shovels are in operating position and are pivotally connected on a transverse axis to rearwardly and downwardly extending brackets 66 integrally formed with the housing 36.

A lifting member 67 is connected to brackets 68 at the rear of the beams 61. Said link is in the form of a bail having forwardly and upwardly extending portions substantially parallel to the forward links 64. The lifting member 67 also has a horizontal shaft portion 69 which extends transversely across the tractor, being supported by brackets 70 connected to the flange of the frame member 17. A quadrant 71 is rigidly secured to the bracket 70 at the inside of the frame member 17. A lifting lever 72 is pivoted on the shaft portion of the link 69, and is provided with a detent mechanism 73 engageable with notches on the quadrant 71. A link 74 pivoted on the lifting lever 72 extends through a lever arm 75 rigidly secured to the shaft portion 69 of the lifting member 67. A spring 76 is shown surrounding the link 74 and abutting the lever 75 and a stop 77 on the link to provide means for exerting spring pressure in a downward direction against the beams 61. The stop 77 abuts the lower side of the lever 75 when the lifting lever 72 is moved forwardly, thereby raising the rear end of the beams 61 and simultaneously with a substantially parallel movement lifting the forward ends of the beams 61.

The cultivating attachment, as above described, has been shown only to illustrate a row-crop implement. The off-set tractor of the invention is particularly adapted for and suitable for row-crop operation either for tillage tools or for harvesting mechanisms.

When operating the tractor of the invention for row-crop work with a cultivator, as illustrated, the tractor is operated with the row passing directly beneath the tractor substantially below the center line thereof. A plant has been illustrated in Figure 3 to show the position of the row.

In row-crop operation, it is desirable not only to see the portion of the row on which the implements are operating but also to view the approaching row. With certain types of row irregularities, it is necessary to steer the tractor somewhat before approaching the irregularities in order to follow closely the plants in the row. An operator on the tractor, as described, has perfect vision ahead of the tractor of the approaching row. The entire frame structure, the power plant and the accessories thereof lie entirely to one side of the center line of the tractor. This can be easily ascertained by noting the center lines on Figures 2 and 3 of the drawings which are placed on the drawings to point out the off-set nature of the tractor. There is some slight obstruction due to the member 36 which houses the steering gear mechanism and forms a support for the tractor on the pivot pin 39 centrally of the front axis. This obstruction, however, has been reduced to a minimum and an operator from a station at the rear of the tractor may glance above and below the housing with sufficient rapidity to obtain practically a complete view at all times of the approaching row. As will be evident, the view is also substantially complete with a line of vision from a point in the center line or at any point laterally therefrom at the side opposite the frame structure. The row may, therefore, be followed very closely by viewing the irregularities before the tractor actually passes over the row. This is an essential feature in following irregularities for any kind of work in which it is necessary to follow both general irregularities or large curvature and small irregularities such as are found in check row planting. As the row passes beneath the tractor, the operator sees the plants substantially under the front axle of the tractor. In this position, they are in transverse alinement with the front wheels and where steering is most effective to permit dodging and to follow the smaller irregularities in the plant positions as closely as would be possible under any conditions.

As above pointed out, applicants have provided a tractor which incorporates three important essentials in careful operation upon plant rows: first, the approaching row is visible in advance of the tractor; second, the individual plants are visible under the tractor in alinement with the front wheels where steering is most effective; and third, the plants after operation are visible directly below the tractor at close range by the operator so that he may ascertain the quality of the work being done.

It is to be understood that only a preferred embodiment of the invention has been illustrated and that all modifications falling within the scope of the appended claims are contemplated as forming a part of the invention.

What is claimed is:

1. A row-crop tractor comprising a front axle structure having spaced wheels adapted to straddle a row of plants, a rear axle structure having spaced wheels adapted to straddle the same plant row, a frame structure connecting said axle structures, and a power plant mounted at the front of the frame structure, said power plant and a major front portion of the frame structure on which it is mounted being positioned entirely laterally to one side of the center line between the front wheels, and an operator's station at the rear of the tractor on the side opposite the frame structure, whereby an operator at the rear of the tractor has substantially complete vision ahead of the tractor to view an approaching row.

2. A row crop tractor comprising a front axle structure having spaced wheels, a rear axle structure having spaced wheels, a narrow frame connecting said axle structures and positioned laterally at one side of the center line between the wheels, a power plant mounted on the front of the frame positioned laterally of the center line in the same direction as the frame, an operator's station on the rear axle structure on the side opposite the frame, whereby an operator has substantially complete vision ahead of the tractor to view an approaching row and downwardly below the tractor to observe the passage of plants beneath the tractor.

3. A row crop tractor comprising a front axle structure having spaced wheels, a rear axle structure having spaced wheels, a combined unit frame and power plant mounted laterally at one side of the longitudinal center line between the front wheels and rigidly connected to the rear axle structure, means for pivotally connecting the front of said unit frame and power plant to the center of the front axle structure, and an operator's station at the rear on the side opposite the power plant, whereby an operator has complete vision ahead of the tractor to view an approaching row and downwardly below the tractor to observe the passage of plants beneath the tractor.

4. A row crop tractor comprising a front axle structure having spaced wheels, a rear axle structure having spaced wheels, a combined unit frame and power plant mounted laterally at one side of the center line of the tractor and rigidly connected to the rear axle structure, a supporting structure extending laterally from said frame at the front thereof over the center of the front axle, means for pivotally connecting said supporting structure to the center of the front axle structure, and an operator's station at the rear on the side opposite the main frame, whereby an operator has complete vision ahead of the tractor to view an approaching row and downwardly below the tractor to observe the passage of plants beneath the tractor.

5. A row crop tractor comprising a front axle construction having spaced wheels, a rear axle structure having spaced wheels, a frame structure mounted laterally entirely at one side of the center line of the tractor, a driver's station at the rear on the side opposite the frame structure, a steering gear for the tractor including a downwardly extending steering shaft located adjacent the main frame near the center line of the tractor, and a power plant on the frame structure located laterally beyond the center line of the tractor in the direction of the main frame, whereby an operator has substantially complete vision ahead of the tractor to view an approaching row and downwardly below the tractor to observe the passage of plants beneath the tractor.

6. A row crop tractor comprising a front axle construction having spaced wheels, a rear axle structure having spaced wheels, a frame structure mounted laterally entirely at one side of the center line of the tractor, a driver's station at the rear on the side opposite the frame structure, a steering gear for the tractor including a steering shaft located adjacent the main frame near the center line of the tractor, a support connected to the upper end of the steering shaft and laterally therefrom to the frame structure side of the tractor, and a power plant on the frame structure located laterally beyond the center line of the tractor in the direction of the emain frame, whereby an operator has substantially complete vision ahead of the tractor to view an approaching row and downwardly below the tractor to observe the passage of plants beneath the tractor.

7. A row crop tractor comprising a front axle construction having spaced wheels adapted to straddle a row of plants, a rear axle structure having spaced wheels adapted to straddle the same row, a frame structure located laterally entirely at one side of the longitudinal center line between the wheels and rigidly connected to the rear axle structure at that side, said frame structure being provided at the front with an offset mounting portion pivotally connected to the center of the front axle structure, a driver's seat mounted at the rear of the tractor on the side opposite the frame structure, a steering gear for the tractor located adjacent the center line of the tractor, and a power plant on the frame structure located laterally beyond the center line of the tractor in the direction of the frame structure, whereby an operator has substantially complete vision ahead of the tractor to view an approaching row and downwardly below the tractor to observe the passage of plants beneath the tractor.

8. A row crop tractor comprising a front axle construction having spaced wheels, a rear axle structure having spaced wheels, a frame structure mounted laterally entirely at one side of the center line of the tractor and rigidly connected to the rear axle structure at that side, said frame structure being provided at the front with an offset portion pivotally connected to the center of the front axle structure, said offset portion including steering mechanism, a driver's seat mounted at the rear of the tractor on the side opposite the frame structure, a steering gear for the tractor with the steering column thereof located adjacent the center line of the tractor and extending downwardly to the offset portion of the frame structure, and a power plant on the frame structure located laterally beyond the center line of the tractor in the direction of the frame structure, whereby an operator has substantially complete vision ahead of the tractor to view an approaching row and downwardly below the tractor to observe the passage of plants beneath the tractor.

9. A tractor comprising a front axle construction having spaced wheels, a rear axle structure having spaced wheels, said axles having the same longitudinal center line, a frame structure mounted laterally entirely at one side of the center line of the axles and rigidly connected to the rear axle structure at that side, said frame structure being provided at the front with a laterally offset portion pivotally connected to the center of the front axle construction, a driver's station at the rear of the tractor, and a power plant on the frame structure.

10. A row crop tractor comprising a front axle construction having spaced wheels, a rear axle structure having spaced wheels, said axles having the same longitudinal center line, a frame structure mounted laterally entirely at one side of the center line of the axles and rigidly connected to the axle structure at that side, said frame structure being provided at the front with an offset portion pivotally connected to the center of the front axle structure, a driver's seat mounted at the rear of the tractor on the side opposite the frame structure, and a power plant on the frame structure located laterally beyond the center line in the direction of the frame structure.

11. A row-crop tractor comprising a front axle structure having spaced wheels adapted to straddle a row of plants, a rear axle structure having spaced wheels adapted to straddle the same row, said axle structures having a common center line between the wheels, a frame structure connecting said axle structures and supported thereby, the front half portion of said frame structure being offset laterally to one side of said center line, and an operator's station at the rear of the tractor at the side opposite the frame structure whereby the operator has substantially complete vision ahead of the tractor at the side opposite the frame structure and below the front portion thereof at said side to view an approaching row.

EDWARD A. JOHNSTON.
ALEXUS C. LINDGREN.